(12) United States Patent
Bennison et al.

(10) Patent No.: US 6,862,814 B2
(45) Date of Patent: Mar. 8, 2005

(54) HIGH SPEED LINEAR DISPLACEMENT MEASUREMENT

(75) Inventors: Stephen J. Bennison, Bellevue, WA (US); Bruce S. Howard, Bellevue, WA (US); Vincent Thompson, Seattle, WA (US); Paul E. Jennerjohn, Sammamish, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/323,806

(22) Filed: Dec. 20, 2002

(65) Prior Publication Data

US 2004/0117999 A1 Jun. 24, 2004

(51) Int. Cl.[7] .................................................. G01B 5/20
(52) U.S. Cl. ........................................... 33/554; 33/551
(58) Field of Search ........................ 33/554, 712, 530, 33/775, 549, 551, 552, 555

(56) References Cited

U.S. PATENT DOCUMENTS

| | | | | |
|---|---|---|---|---|
| 2,977,533 A | * | 3/1961 | Savage | 33/551 |
| 3,040,437 A | * | 6/1962 | Polidor | 33/552 |
| 4,411,073 A | * | 10/1983 | Ryan | 33/530 |
| 4,897,925 A | * | 2/1990 | Johns | 33/551 |
| 5,276,974 A | * | 1/1994 | Chanoni et al. | 33/503 |
| 5,335,422 A | | 8/1994 | Ferguson | 33/533 |
| 5,515,615 A | * | 5/1996 | Twigg et al. | 33/551 |
| 5,535,143 A | * | 7/1996 | Face | 33/554 |
| 6,151,791 A | * | 11/2000 | Shimazutsu et al. | 33/552 |
| 6,349,755 B1 | * | 2/2002 | Sardo | 33/552 |
| 6,460,264 B1 | | 10/2002 | Bos et al. | 33/549 |
| 6,532,678 B2 | * | 3/2003 | Morgan | 33/530 |
| 6,701,633 B2 | * | 3/2004 | Ohtsuka | 33/552 |

FOREIGN PATENT DOCUMENTS

| | | |
|---|---|---|
| GB | 2197477 | 5/1988 |
| JP | 59251040 | 11/1984 |
| JP | 08136449 | 5/1996 |
| JP | 10-148506 | 6/1998 |
| JP | 11023252 | 1/1999 |
| WO | 96/13699 | 5/1996 |

* cited by examiner

Primary Examiner—Christopher W. Fulton
(74) Attorney, Agent, or Firm—Baker & Hostetler LLP (57) ABSTRACT

An inspection device includes a mount that secures the inspection device to the object for travel along the object, a sensor attached to the mount that measures characteristics of the object, and a position indicator attached to the mount that determines the position of the inspection device on the object.

40 Claims, 11 Drawing Sheets

| | Main | QAIP | Setup | Section | Graph | Calibrate | Configure | Points | Help |
|---|---|---|---|---|---|---|---|---|---|

Part 112A1201-962, Order 424472

| Go To Graph | Visible Row? | Conform? | Eng L Dim | IMAC L Dim | L Upper Tol | L Lower Tol | Measured L Dim | L Deviation | Feature Name | Point Type | Feature Eng Dim |
|---|---|---|---|---|---|---|---|---|---|---|---|
| Graph | Yes | User Locate | 589.0400 | 588.8605 | +0.0300 | -0.0300 | | | C | T | 2.4000 |
| Graph | Yes | Unknown | 589.4539 | 589.2776 | +0.2500 | -0.2500 | | | A | T | 1.7900 |
| Graph | Yes | L Out | 590.1757 | 589.9995 | +0.1000 | -0.1000 | 590.2652 | +0.2657 | A | T | 1.8800 |
| | Yes | User Locate | 590.1757 | 589.9995 | +0.1000 | -0.1000 | | | E | T | 0.9953 |
| Graph | Yes | User Locate | 591.1710 | 590.9942 | +0.0300 | -0.0300 | | | A | T | 1.8800 |
| Graph | Yes | Yes | 591.8910 | 591.7132 | +0.2500 | -0.2500 | 591.9426 | +0.2294 | A | T | 1.7900 |
| Graph | Yes | Unknown | 597.5410 | 597.3566 | +0.2500 | -0.2500 | | | C | M | 1.8040 |
| Graph | Yes | Yes | 597.9362 | 597.7550 | +0.2500 | -0.2500 | 597.9564 | +0.2014 | A | T | 1.7900 |
| Graph | Yes | L Out | 598.7191 | 598.5340 | +0.1000 | -0.1000 | 598.8341 | +0.3001 | C | T | 1.9300 |
| | Yes | User Locate | 598.7191 | 598.5340 | +0.1000 | -0.1000 | | | E | T | 1.0809 |
| Graph | Yes | L Out | 598.7191 | 598.5380 | +0.1000 | -0.1000 | 598.8081 | +0.2701 | A | T | 1.9000 |

| Show Header | Show Non Conform Only | Show Fewer Columns | Track L Position | Load QAIP | Save QAIP | Re Calc | Scroll Left | Scroll Right | Scroll Down | Scroll Up |

HIGH SPEED LINEAR DISPLACEMENT MEASUREMENT

FIELD OF THE INVENTION

The present invention relates generally to the measurement of objects. More particularly, the present invention relates to the measurement of cross-sectional dimensions of an object to ensure that the dimensions meet certain threshold criteria.

BACKGROUND OF THE INVENTION

Objects such as spar chords, which are essentially the frame of an airplane wing, are measured to ensure that the dimensions of the object meet certain threshold requirements. In the case of spar chords, achieving these dimensions assist in providing airplane wings that will withstand the elements associated with flying.

Figure 1:
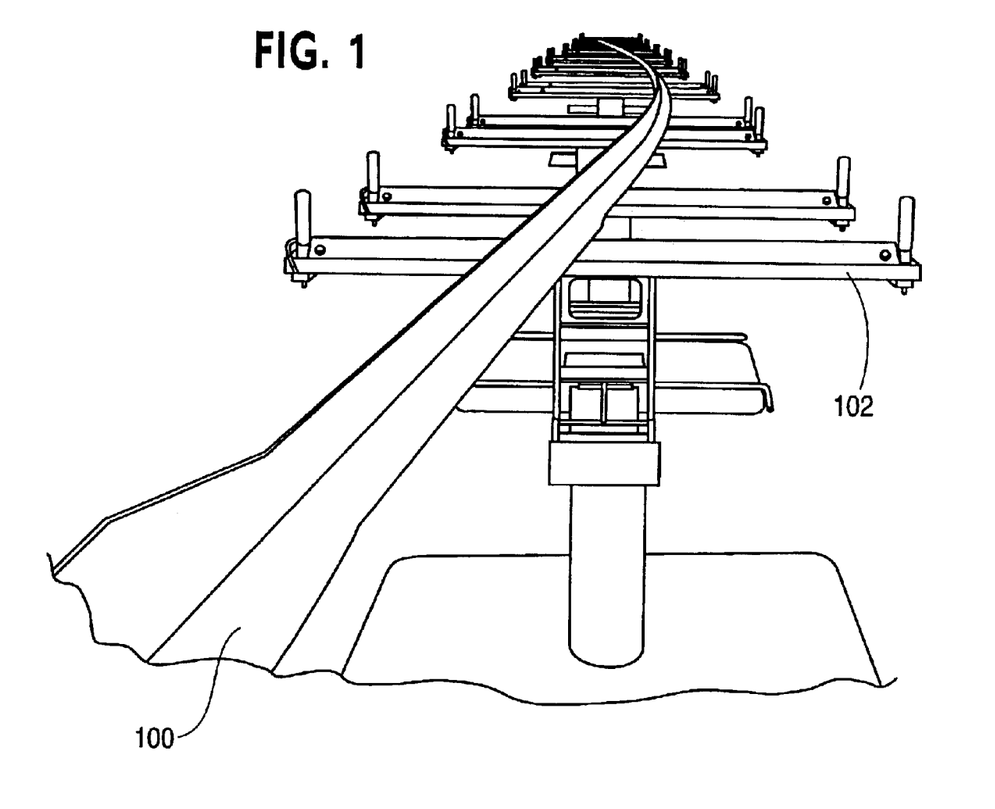
FIG. 1 is an illustration of a spar chord being supported by saw horse devices.
Figure 2:
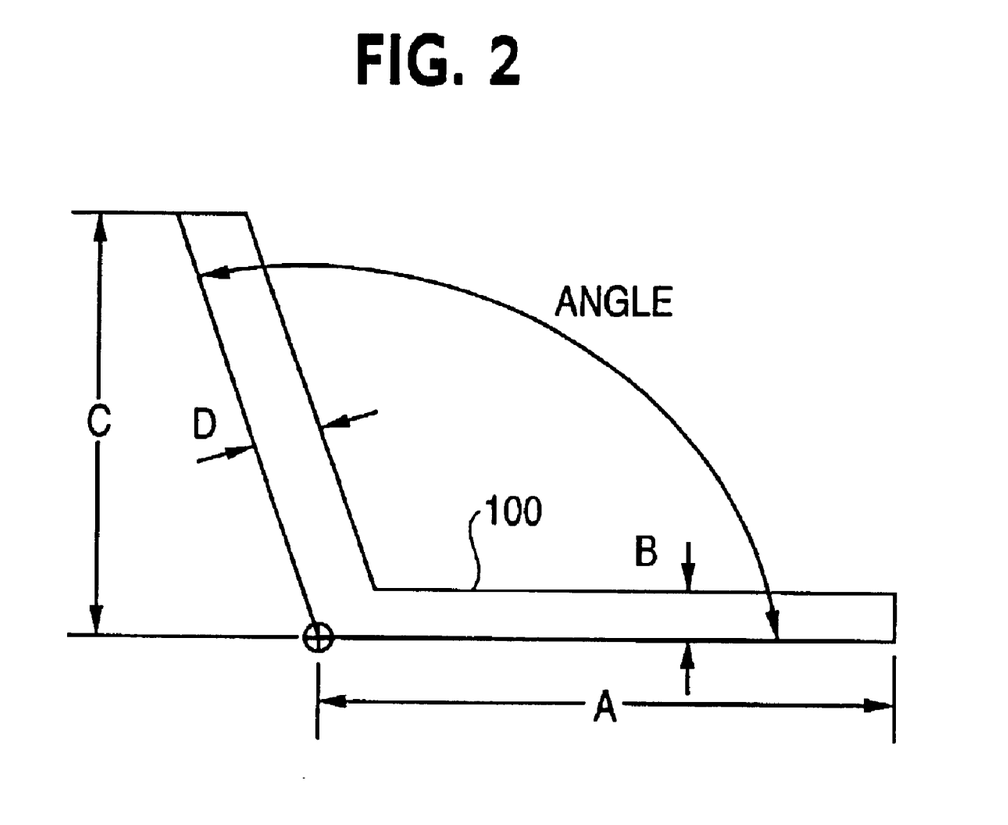
FIG. 2 is an illustration of a spar chord and its cross-sectional dimensions.

Spar chords can be sixty (60) to one hundred (100) feet in length and can have angled shaped parts that form the four (4) corners of a wing box. FIG. 1 depicts a spar chord 100 supported by saw horse devices 102. There can be, for example, a total of eight (8) spar chords per airplane. Spar chords typically can vary in five basic cross-sectional dimensions as shown in FIG. 2.

The first dimension of the spar chord 100 is the base which has a length "A". The second dimension is the thickness of the base "B". The spar chord 100 has a component that extends upward from the base which has a vertical height "C" (the third dimension) and a thickness "D" (the fourth dimension). The fifth dimension is the "angle" formed between the base and the component extending upward from the base. In practice, these five (5) basic dimensions can have, for example, up to 11 variations or more that are not consistently defined on all plane models.

It is necessary to measure up to 300 features on each part. Each feature is defined as a transition point. The measurement requirement is generally two fold. First, the length portion of the transition is located and then second, the cross section is measured. Complicating the problem of measurement is that a large percentage of the transitions in the cross-section are so gradual that the transition point is often obscured by surface roughness introduced in hand finishing operations. The requirement to locate the transition point of a feature dictates that many points in the region of the transition must be measured. A sufficient number of points must be measured before and after the transition to accurately calculate the transition portion.

Figure 3:
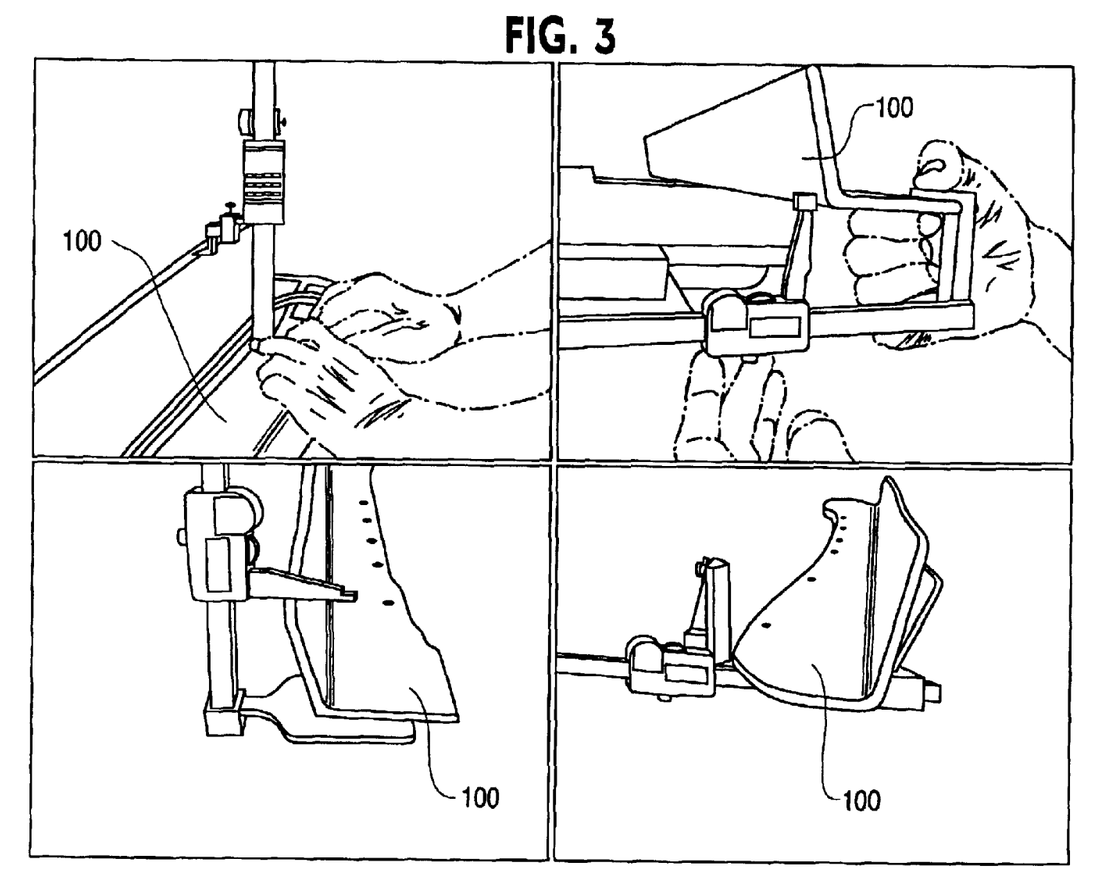
FIG. 3 is an illustration of instruments used to measure cross-sections of a spar chord.

Hand tools as depicted in FIG. 3 have been used to measure dimensions of a spar chord. In order to determine if a spar chord meets certain dimensional criteria, a steel tape is stretched along the length of the spar chord and is clamped at both ends. A part drawing along with a Quality Assurance Inspection Plan (QAIP) are typically utilized to determine which part of the spar chords need to be measured and tolerance ranges for each measurement. This is done manually by locating specified transitional positions, referred to as "dollar sign" surfaces, on the base of the spar chord. These transitional positions are marked by hand down the entire length of the spar chord (could be from 60 to 100 feet). After the spar chord is marked, each marked transitional position is identified and matched up to the part drawing and correlated to the QAIP to determine which dimensions must be measured and the tolerance ranges the dimensions must fall within.

This method of part layout, manual measurement and manual comparison to a part specification is to some extent labor intensive and sometimes can present a flow bottleneck in a factory cell. Thus, it would be desirable to have an inspection system, apparatus and method for making such measurements.

SUMMARY OF THE INVENTION

The present invention provides in some embodiments a high speed linear displacement system, method and apparatus that can provide a decrease in per part inspection time by automatically measuring and inspecting dimensions of objects such as spar chords.

In accordance with one embodiment of the present invention, an inspection device includes a mount that secures the inspection device to the object for travel along the object, a sensor attached to the mount that measures characteristics of the object, and a position indicator attached to the mount that determines the position of the inspection device on the object.

The inspection device can also include a plurality of sensor channels that keep track of the progress the inspection device has made on the object. A processing device can also be provided in communication with the sensor. The processing device records measurements made by the sensor and can also be in communication with the position indicator. The processing device records positions determined by the position indicator.

A memory can be provided in communication with the sensor. The memory stores characteristics of the object measured by the sensor.

The inspection device can also include a processing device in communication with the sensor and the position indicator. A memory can also be provided in communication with the sensor and the position indicator. The memory stores measurements made by the sensor and the position indicator.

The inspection device can also include a display in communication with the processing device and the processing device can include logic that displays measurements made by the sensor and the position indicator on the display.

The sensor in one embodiment of the invention can be a linear displacement sensor.

In an alternate embodiment of the invention a method of inspecting an object includes the steps of: securing an inspection device to the object; sensing characteristics of the object with a displacement sensor; and determining a position of the securing device on the object.

The method can also include the step of sensing cross-sectional dimensions of a spar chord, or comparing sensed characteristics with threshold tolerances.

In other embodiments, the invention can include the step of keeping track of the progress the inspection device makes on the object. In some embodiments of the invention measurements made by the sensor can be recorded to determine if threshold tolerances have been met. Positions determined by the position indicator can also be recorded the determine threshold tolerances.

The method can also include storing characteristics measured by the sensor into a memory. These characteristics measured by the sensor can be displayed. Positions determined by the position indicator can also be displayed. In some cases measurements made by the sensor and positions determined by the position indicator can both be displayed.

In another embodiment of the invention, a system for inspecting an object includes means for securing an inspection device to the object; means for sensing characteristics of the object; and means for determining a position of the securing device on the object.

The system can also include means for keeping track of the progress the inspection device makes on the object. A means for recording measurements made by the sensing means can be provided. In other embodiments of the invention, a means for recording positions determined by the position determining means can be provided.

The system can also include a means for storing characteristics measured by the sensing means into a memory. A means for displaying characteristics measured by the sensing means can also be provided. The system can also include a means for displaying positions determined by the position determining means. A means for displaying measurements made by the sensing means and positions determined by the position determining means can also be provided.

In an alternate embodiment of the invention, a device for inspecting an object includes a displacement gauge and a wheel having a roller bearing attached to the displacement gauge. An encoder that tracks movement of the wheel on the object is also provided.

The wheel can be round or spherical, which can help compensate for side loads. The device can further include an extension spring attached to the device that keeps the wheel in contact with the object.

A retraction lever connected to the device can be provided to move the wheel so that the wheel is not in contact with the object.

The displacement gage can be in some cases a linear displacement gage.

The present invention in another embodiment can be a method for inspecting an object. The method can include the steps of contacting the object with a wheel having a roller bearing attached to a displacement gage; moving the wheel along a surface of the object and recording measurements made by the displacement gage; and keeping track of senor movement on the object.

The wheel can be round or spherical, which can help compensate for side loads. The method can include the step of maintaining wheel contact on the object using an extension spring. In other embodiment, the method can include the step of moving the wheel so that it is not in contact with the object.

In another embodiment of the invention, a system for inspecting an object includes a means for contacting the object with a wheel having a roller bearing attached to a displacement gage; a means for moving the wheel along a surface of the object and recording measurements made by the displacement gage; and a means for keeping track of senor movement on the object.

The wheel can be round or spherical. The system can also include a means for maintaining wheel contact on the object and/or a means for moving the wheel so that it is not in contact with the object.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 4:
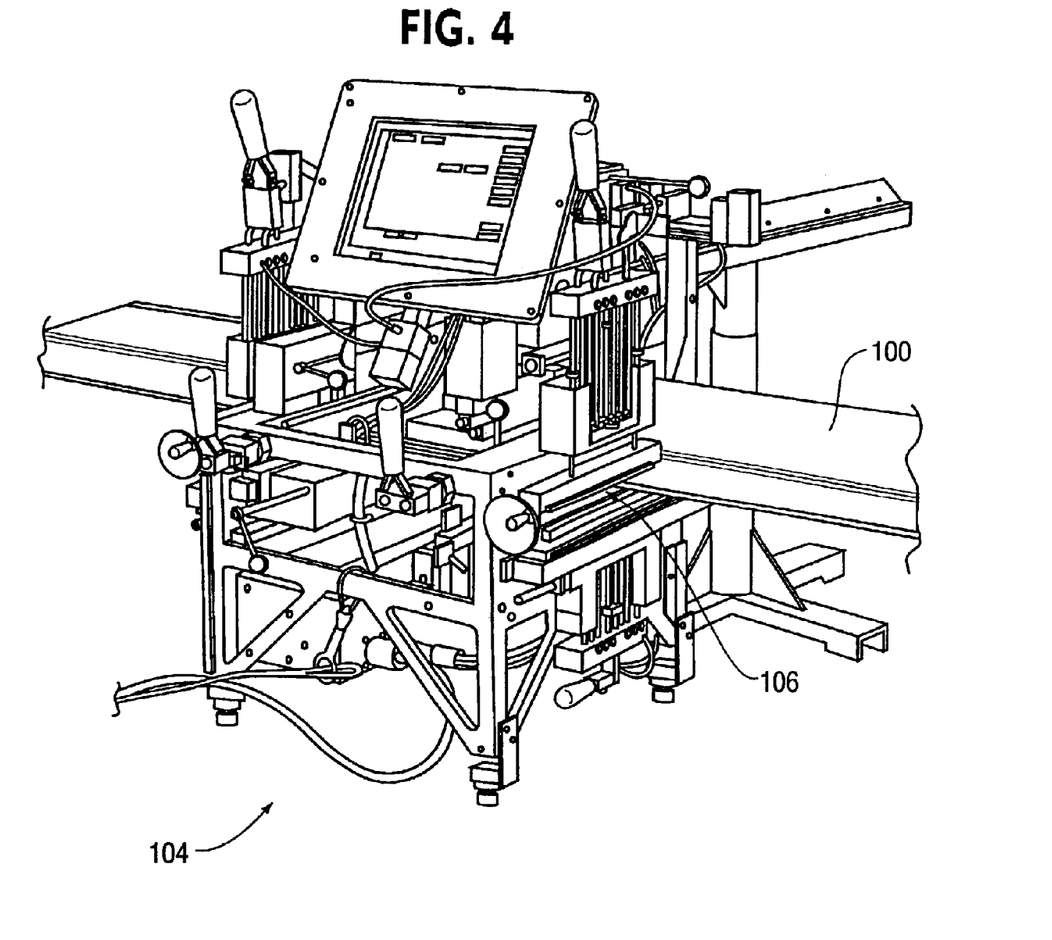
FIG. 4 is an illustration of an inspection device attached to a spar chord.

The present invention provides for high speed linear displacement measurement of objects such as spar chords. One embodiment of the invention is depicted in FIG. 4. An inspection device 104 is attached to a spar chord 100. The inspection device 104 is attached to the spar chord 100 by opening up pinch clamp rollers 106 and then threading the inspection device 104 onto the spar chord 100. Once the inspection device 104 is threaded onto the spar chord 100, the pinch rollers 106 are clamped down onto the spar chord 100. As shown in FIG. 4, the pinch rollers 106 provide a mount for the inspection device 104 and secures the inspection device 104 onto the spar chord 100. Inspection device 104 can now ride, glide or travel on the spar chord 100.

The inspection device 104 also has information relating to the position and dimensions that need to be measured on the spar chord 100 embedded into a processor or memory on the inspection device 104. This information can be loaded onto a memory which can be read by the inspection device 104. It is noted that the memory device and/or processor can be located on the inspection device 104 or external to the inspection device 104.

Once the inspection device 104 is attached to the spar chord 100, the inspection device 104 must be initialized. The inspection device can be pushed to one end of the spar chord and "zeroed" to indicate that this is the beginning position. Once the inspection device 104 is "zeroed" onto the spar chord 100, this beginning position can be coordinated with the information stored in memory to indicate that the inspection device is at the beginning of the spar chord.

An operator can then push the inspection device 104 along the spar chord 100. The inspection device 104, as it moves along the spar chord 100, takes measurements and compares them to information stored in the inspection device 104. Thus, the need to measure the entire length of the spar chord 100, hand mark transition points and then go back and take cross sectional dimensions of the spar chord 100 is eliminated by allowing the inspection device 104 to take measurements as an operator pushes the inspection device 104 down the spar chord 100.

Figure 5:
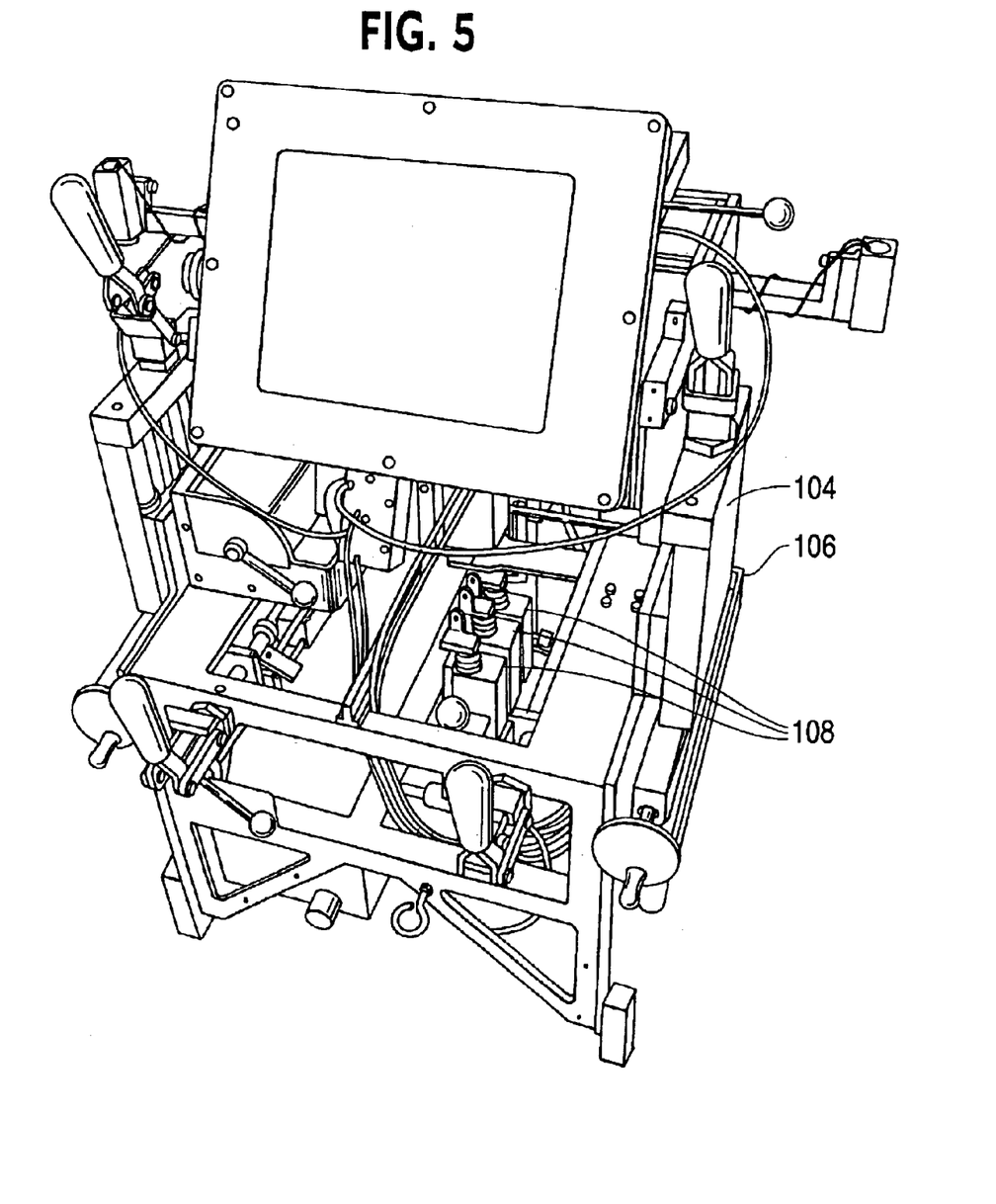
FIG. 5 is an illustration of an inspection device.

In order for the inspection device 104 to accomplish these measurements, sensors are provided on the inspection device 104. The inspection device 104 illustrated in FIG. 5 shows a top view of three sensors 108 that can be utilized to measure dimensions of a cross section of the spar chord 100. The three sensors 108 are high speed displacement sensors which measure characteristics of the spar chord 104 through displacement. It is noted that other types of sensors can be used in this application.

Figure 6:
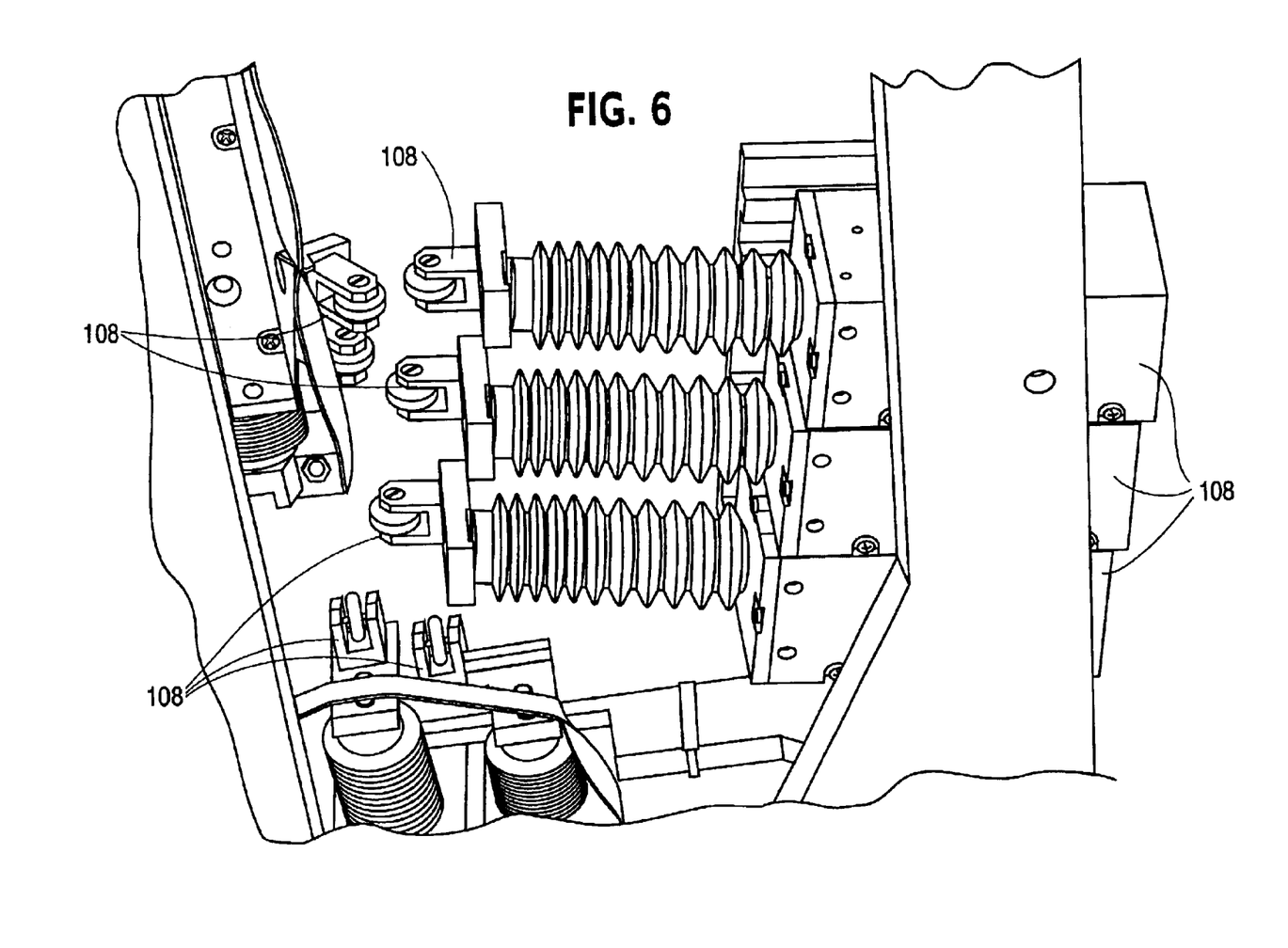
FIG. 6 is an illustration of linear sensors.
Figure 7:
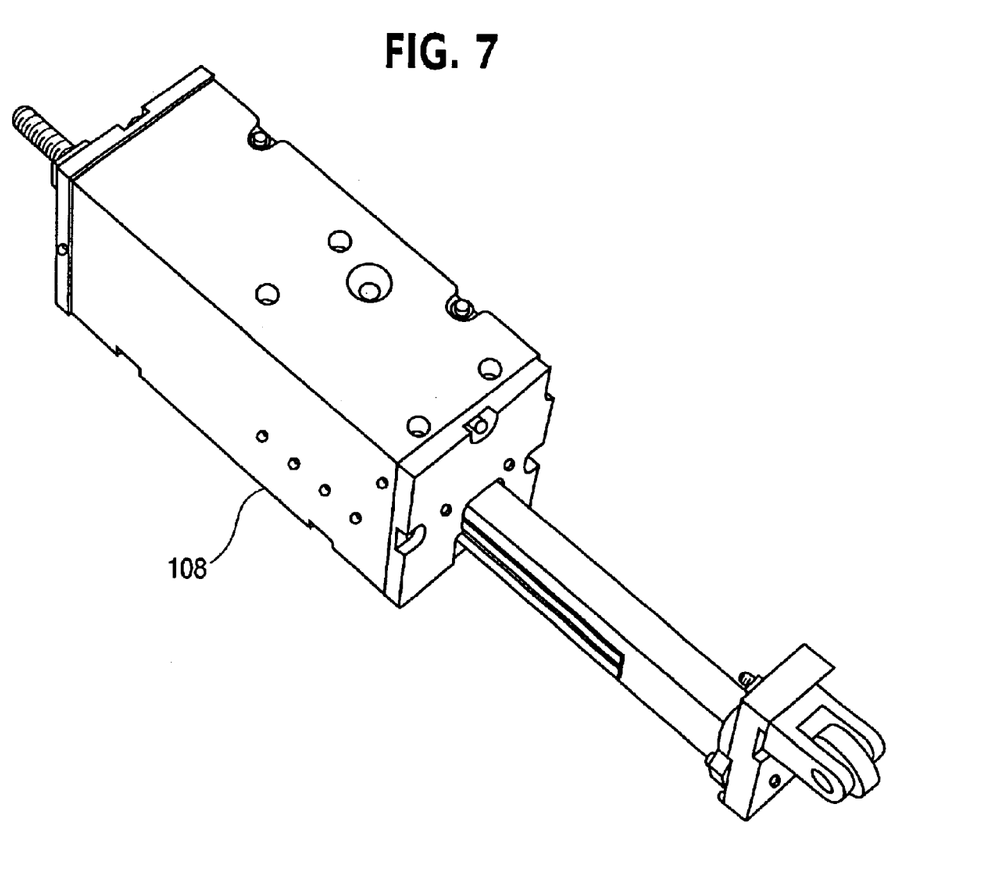
FIG. 7 is an illustration of a linear sensor.

As illustrated in FIG. 6, multiple sensors 108 can be used to measure different cross sectional dimensions of a spar chord 100. FIG. 7 is an illustration of a high speed displacement sensor 108, which is not attached to an inspection device 104. The high speed displacement sensor 108 illustrated in FIG. 7 provides for high speed linear displacement data acquisition so that part features can be measured rapidly. This can be accomplished through the use of Renishaw® Tape Scale systems integrated with a linear slide into a compact industrial hardened case. The present invention also provides for sensor retraction to avoid collisions with other part features.

In one embodiment of the invention, a spring loaded IKO® linear slide and a Renishaw® Tape Scale encoder are used to measure linear displacement. As the actuator is displaced against the spring, the tape scale encoder monitors and resolves the magnitude of the displacement. This displacement can then be displayed by digitizing electronics in a computer or a display read-out.

Figure 8:
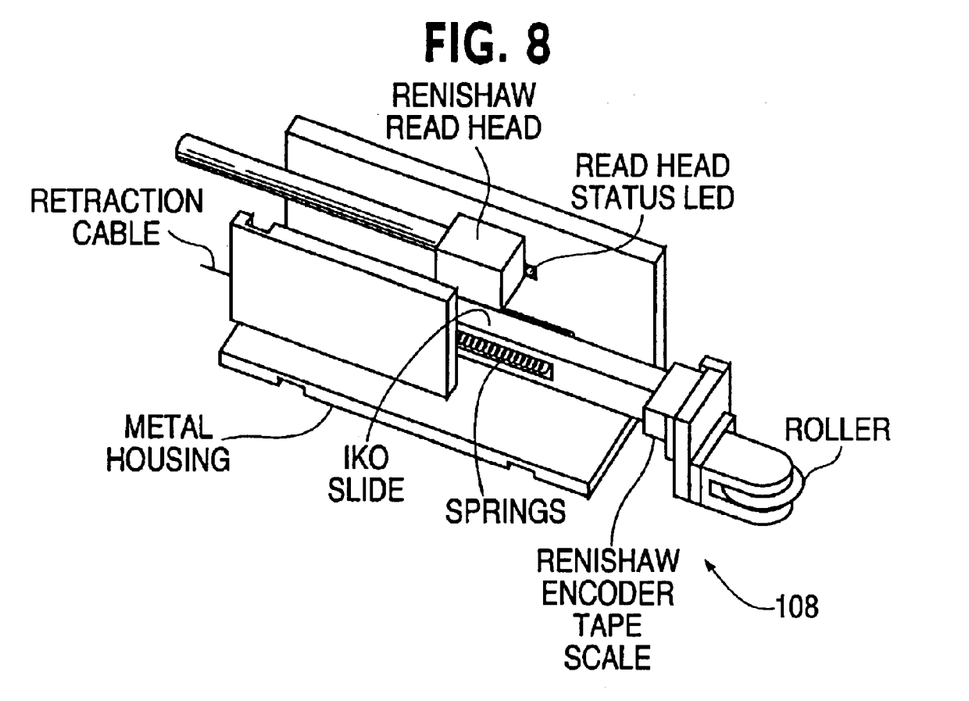
FIG. 8 is an illustration of the inside of a linear sensor.

The wheel or roller illustrated in FIG. 8 can make contact with the spar chord 100. As the dimensions of the spar chord 100 vary, the actuator is displaced against the spring. A displacement gage can be provided to measure the amount of displacement in order to determine a dimension of spar chord 100. As can be seen in FIG. 8 as the cross sectional dimensions of the spar chord 100 vary, the wheel or roller will be displaced toward the body of the sensor 108. Within the body of this sensor 108 a displacement gage such as an IKO® slide model LWL 7C1R6OBH can be provided for straight linear travel of the mechanism.

An encoder can be provided to track movement of the sensor 108 on spar chord 100. In one embodiment of the invention a Renishaw® encoder tape is used (model A9517-004) to provide scale markers for the read head and a Renishaw® encoder read head (model RGH24015A00A) is used to detect scale marker transitions.

An extension spring is provided so that the wheel or roller has consistent contact force on the measurement surface (spar chord 108). The roller contacts the work surface and allows the mechanism to travel along the surface. In one embodiment of the invention the rollers are round or spherical in shape and have pivot bearings or roller bearings.

Retention cables are also provided to allow the roller to be held in a fully retracted position so as not to contact the spar chord 100. The design of the sensor is unique in that it can withstand side loads and also track forward and backward motion of the sensor.

The custom aluminum case holds the component together. In one embodiment of the invention the case is 1.25 inches by 2.7 inches. Having a housing of this approximate size will allow for small component size, so that the sensor 108 will fit into the inspection device 104. This will also create more room for more sensors 108 to be placed into the inspection device 104, allowing for more measurements, which may improve accuracy. The Renishaw® encoder read head as depicted outputs RS422 level quadrature counts. The readout devices are connected to the encoder read head in order to resolve the displacement.

When assembled together, these components measure the linear deflection of the roller ball end with a resolution of less than 0.0001 inches. The deflection speed can be resolved up to 400 inches per second. Although this resolution is dependent on the read-out electronics, testing on this mechanism has resulted in a three sigma accuracy of 0.00018 inches.

Figure 9:
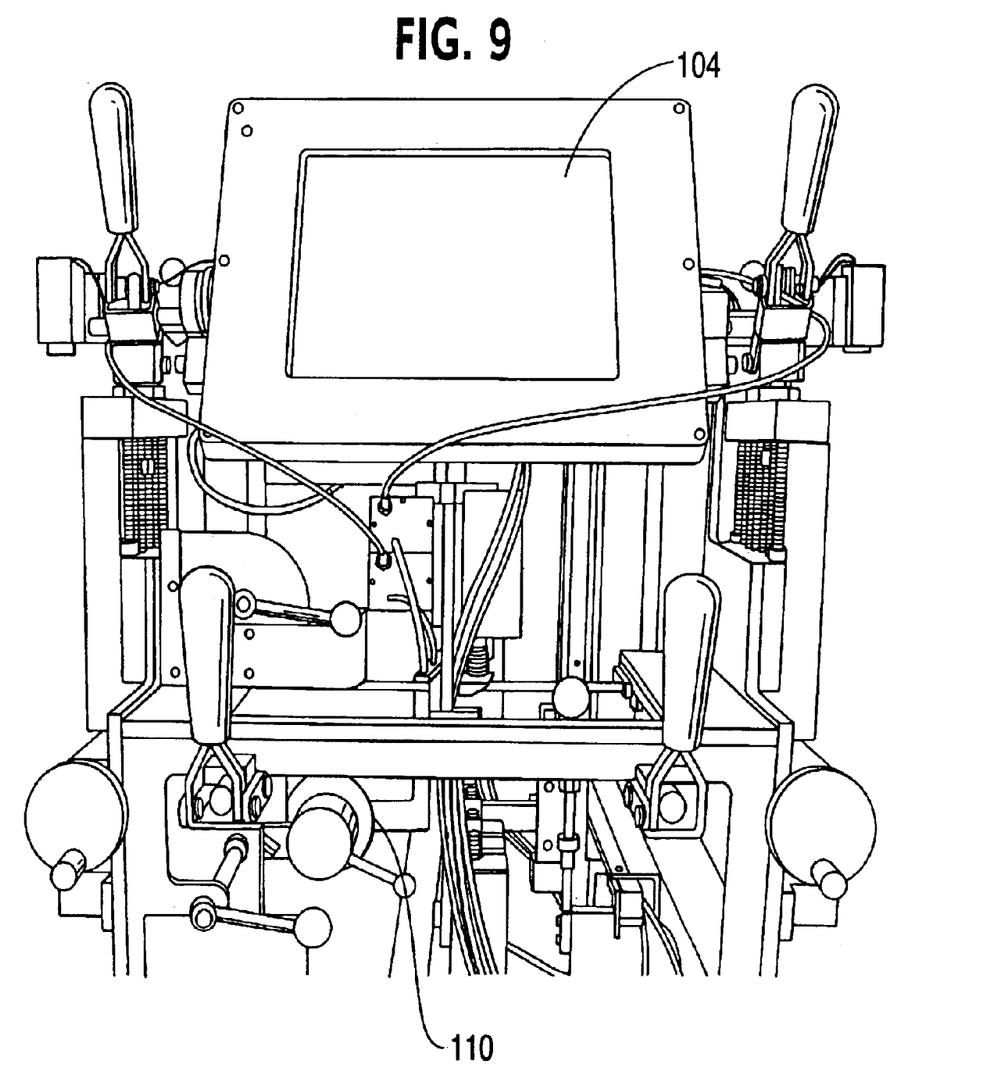
FIG. 9 is an illustration of a position indicator.
Figure 10:
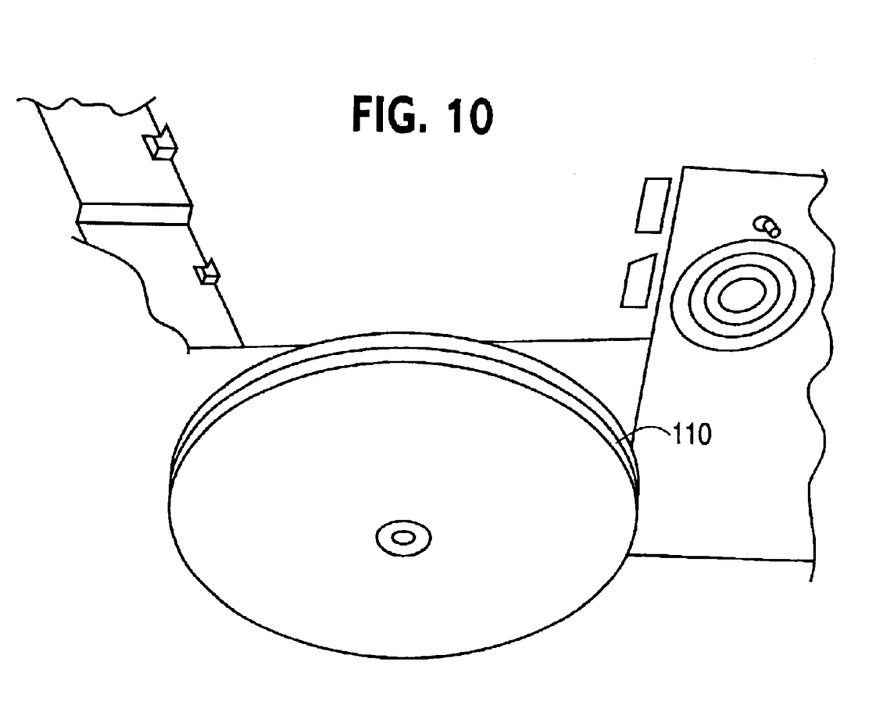
FIG. 10 is an illustration of a rotary position indicator.

FIG. 9 illustrates an inspection device 104 having a position indicator 110. The position indicator 110 illustrated in FIG. 10 provides for determining the position of the inspection device on the spar chord 100. This position indicator can be a length position wheel and rotary encoder 110. The function of this length position wheel and rotary encoder 110 is to determine where on the spar chord 100 the inspection device 104 is located. This position indicator 110 can include a count up and a count down so that if the inspection device 104 is moved forward and then backward it can resolve the position of the inspection device 104 on the spar chord 100.

The inspection device 104 can also include logic embedded into computer hardware in communication with the inspection device 104. This computer hardware can be located on inspection device 104 or external to inspection device 104. The operation of this software embedded in the hardware can be used to take measurements as the inspection device 104 travels along spar chord 100. Initially the cross sectional dimensions and tolerances are loaded into memory (part drawings and QAIP). Then as the inspection device 104 moves down spar chord 100 the position indicator 110 indicates where on spar chord 100 the inspection device 104 is located. The sensors 108 determine the measurements or cross sectional dimensions of the spar chord 100. These measurements are then compared with the stored values (part drawings and QAIP) for the tolerances to determine if the dimensions of the spar chord 100 are acceptable.

Figure 11:
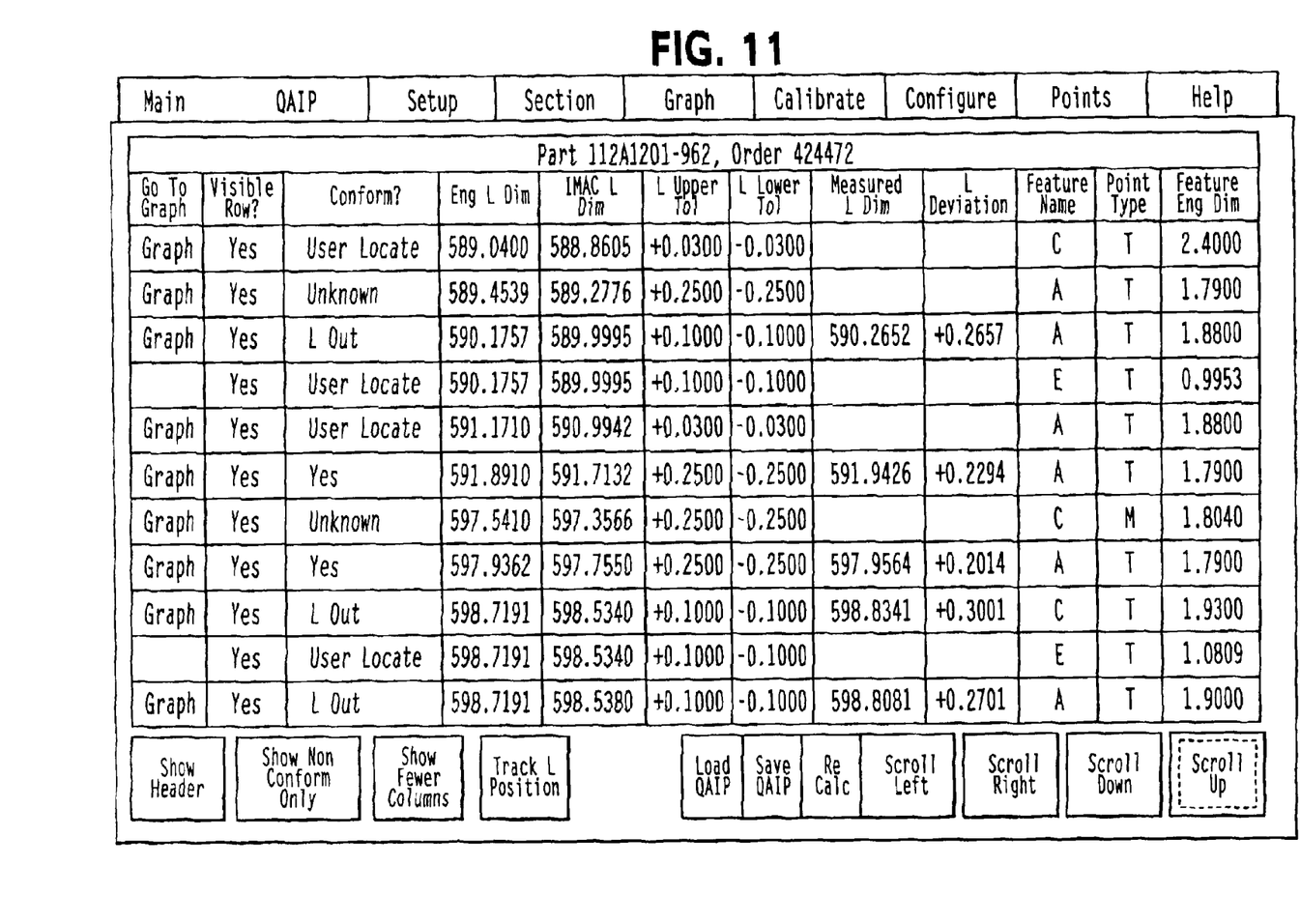
FIG. 11 is an illustration of a display of measurement made by the software of the inspection device.

FIG. 11 shows one embodiment of the invention in which a screen will display the relevant data. As illustrated in FIG. 11 under the third column "Conform", there are two points, which were identified as being conforming. These conforming measurements are identified as "yes" under the "Conform" column. Other indicators are used to show that other measurements could not be confirmed as conforming. For example, the "User Locate" identifier under the "Conform" column can be used to signify that the inspection device 104 could not confirm that the dimensions conform to the relevant tolerances for the cross sectional dimensions of the spar chord 100. Thus, a user would have to manually located these areas and re-measure to determine if the cross sectional dimensions of the spar chords are in conformance with the tolerances. In other cases an "L Out" identifier can be used under the "Conform" heading to signify that the spar chord cross sectional dimension is out of tolerance.

In one embodiment of the invention, the dedicated gauge data acquisition processor runs dedicated embedded codes that are more than capable of acquiring the gauge readings and maintaining synchronization with the length position encoder even at excessive speeds. The displacement sensors are unaffected by high slew rates such as when traversing pad ups. The use of WinRT™ in conjunction with a gauge function dynamic link library written in C perform well also. WinRT™ allows for the necessary elevation of priority for the interrupt driven architecture such that calls from Visual Basic to the DLL are extremely fast. All gage data processing and analysis including graphical display can occur in near real time using this architecture. The choice of an Ampro 233 megahertz single board computer was well suited for this application. Use of Windows 95™ as the operating system greatly simplified the task of QAIP file interface, networking and printing. The choice of Windows 95™ also enabled the use of Visual Basic® for the user interface, which greatly simplified the graphic design.

Thus high-speed linear displacement measurement is accomplished from the foregoing description of the present invention. The design of the present invention involves no fixed machine bed and can use an aluminum frame that is loaded onto a stationary part such as a spar chord. Spring loaded clamp rollers hold the frame index to the part. There can be twelve high-speed linear displacement gages each making continuous rolling contact with the part surface. These twelve gauges continually measure cross section dimensions of the spar chord as the frame rolls down the spar chord's length. Stainless steel wheels can be used and can be mounted to a rotary encoder. The wheels are in continuous contact with the spar chord as the frame rolls down the spar chord's length. The rotary encoder measures the length position of the frame on the spar chord. There can be an onboard 233 megahertz Pentium® single board computer with integrated networking and video function and an integrated touch screen liquid crystal display. The application source code can be written in Visual Basics 6.0® and can provide a form based user interface to the system. A bar code wand can eliminate part and order numbers input errors. The system can automatically load spar chord engineering design definitions from a network file server and as frames roll down the part, the system can continuously display the spar chord cross sectional dimensions, calculate feature points and determine whether the feature points were found to be in conformance. A graphical or tabular results screen can be user selectable. High-speed gauge data acquisition electronics read the gauges in a snap shot fashion.

In one embodiment of the invention there are 14 sensor inputs and 14 separate channels of quadrature counters. These counters basically keep track of the number of counts that a rotary encoder or a linear encoder produce. As soon as the encoder moves, all 14 quadrature counters store the count in memory and signal the main operating system indicating that there is new data. The operating system will eventually get around to the interrupt generated by the signal, while continuing normal processing. In the mean time, another set of counts can be acquired and another interrupt signal will be sent to the processor. This cycle will continue until the memory buffer is empty. This system is capable of measuring spar chord cross-section dimensions every 0.010 inches at a speed of 7 inches per second.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An inspection device for inspecting an object comprising:
    a mount that secures the inspection device to the object for travel along the object, the mount having at least one pair of clamp rollers that clamp onto the object to support the inspection device on the object so the mount is supported and travels by rolling along the object and so the mount is free of support from the base surface when clamped onto the object for travel;
    a sensor attached to the mount that measures characteristics of the object that travels with the mount; and
    a position indicator attached to the mount that determines the position of the inspection device on the object that travels with the mount.

2. The inspection device as recited in claim 1, further comprising a plurality of sensors that tracks of the degree of travel the inspection device has made on the object.

3. The inspection device as recited in claim 1, further comprising a processor in communication with said sensor, that processes measurements made by said sensor.

4. The inspection device as recited in claim 1, further comprising a processing device in communication with said position indicator, said processing device recording positions determined by said position indicator.

5. The inspection device as recited in claim 1, further comprising a memory, in communication with said sensor, that stores characteristics of the object measured by said sensor.

6. The inspection device as recited in claim 1, further comprising a processor in communication with said sensor and said position indicator.

7. The inspection device as recited in claim 6, further comprising a memory in communication with said sensor and said position indicator, that stores measurements made by said sensor and said position indicator.

8. The inspection device as recited in claim 7, further comprising a display in communication with said processing device.

9. The inspection device as recited in claim 8, wherein said processing device comprises logic that displays measurements made by said sensor and said position indicator on said display.

10. The inspection device as recited in claim 1, wherein said sensor is a linear displacement sensor.

11. A method of inspecting an object resting on a base surface. comprising the steps of:
    securing an inspection device to the object by clasping a mount having at least one pair of clamp rollers that clamp onto the object to support the inspection device on the object so the mount is supported and travels by rolling along the object and so the mount is free of support from the base surface when clamped onto the object for travel;
    sensing characteristics of the object with a displacement sensor that travels with the mount; and
    determining a position of the inspecting device on the object.

12. The method as recited in claim 11, further comprising the step of tracking the degree of travel the inspection device makes on the object.

13. The method as recited in claim 11, wherein said step of sensing characteristics comprises the step of sensing cross-sectional dimensions of a spar chord.

14. The method as recited in claim 11, further comprising the step of comparing sensed characteristics with threshold tolerances.

15. The method was recited in claim 11, further comprising the step of comparing sensed characteristics with threshold tolerances.

16. The method as recited in claim 11, further comprising the step of recording the determined position to determine threshold tolerances.

17. The method as recited in claim 11, further comprising the step of storing characteristics measured by the sensor into a memory.

18. The method as recited in claim 11, further comprising the step of displaying characteristics measured by the sensor.

19. The method as recited in claim 11, further comprising the step of displaying the determined positions.

20. The method as recited in claim 11, further comprising the step of displaying measurements made by the sensor and the determined positions.

21. A system for inspecting an object resting on a base surface, comprising:
an inspection device;
means for securing said inspection device to the object for travel along the object the mount having at least one pair of clamp rollers that clamp onto the object to support the inspection device on the object so the mount is supported and travels by rolling along the object and so the mount is free of support from the base surface when clamped onto the object for travel;
means for sensing characteristics of the object that travels with the mount; and
means for determining a position of said inspecting device on the object that travels with the mount.

22. The system as recited in claim 21, further comprising means for tracking the progress the inspection device makes on the object.

23. The system as recited in claim 21, wherein said sensing means comprises means for sensing cross-sectional dimensions of a spar chord.

24. The system as recited in claim 21, further comprising means for comparing sensed characteristics with threshold tolerances.

25. A device for inspecting an object resting on a base surface comprising:
a mount that secures the inspection device to the object for travel alone the object having at least one pair of clamp rollers that clamp onto the object to support the inspection device on the object so the mount is supported and travels by rolling along the object and so the mount is free of support from the base surface when clamped onto the object for travel;
a displacement gauge;
a wheel having a roller bearing and being attached to said displacement gauge so that said wheel can contact the object; and
an encoder that tracks movement of said wheel on the object.

26. The device as recited in claim 25, wherein said wheel is round.

27. The device as recited in claim 25, wherein said wheel is spherical.

28. The device as recited in claim 25, further comprising an extension spring attached to the device that keeps said wheel in contact with the object.

29. The device as recited in claim 25, further comprising a retraction lever connected to the device that can move said wheel so that said wheel is not in contact with the object.

30. The sensor as recited in claim 25, wherein said displacement gage is a linear displacement gage.

31. A method for inspecting an object resting on a base surface. comprising the steps of:
clamping a mount having at least one pair of clamp rollers that clamp onto the object to support the inspection device on the object so the mount is supported and travels by rolling along the object and so the mount is free of support from the base surface when clamped onto the object for travel;
contacting the object with a wheel having a roller bearing attached to a displacement gage;
moving the wheel along a surface of the object and recording measurements made by the displacement gage; and
keeping track of movement of the wheel on the object.

32. The method as recited in claim 31, wherein said wheel is round.

33. The method as recited in claim 31, wherein said wheel is spherical.

34. The method as recited in claim 31, further comprising the step of maintaining wheel contact on the object using an extension spring.

35. The method of claim 31, further comprising the step of moving the wheel so that it is not in contact with the object.

36. A system for inspecting an object resting on a base surface. comprising:
means for clamping a mount having at least one pair of clasp rollers that clamp onto the object to support the inspection device on the object so the mount is support and travels by rolling along the object and so the mount is free of support from the base surface when clamped onto the object for travel;
means for contacting the object with a wheel having a roller bearing attached to a displacement gage;
means for moving the wheel along a surface of the object and recording measurements made by the displacement gage; and
means for keeping track of movement of the wheel on the object.

37. The system as recited in claim 36, wherein said wheel is round.

38. The system as recited in claim 36, wherein said wheel is spherical.

39. The system as recited in claim 36, further comprising means for maintaining wheel contact on the object.

40. The system as recited in claim 36, further comprising means for moving the wheel so that it is not in contact with the object.

* * * * *

UNITED STATES PATENT AND TRADEMARK OFFICE
CERTIFICATE OF CORRECTION

PATENT NO. : 6,862,814 B2
DATED : March 8, 2005
INVENTOR(S) : Stephen J. Bennison et al.

It is certified that error appears in the above-identified patent and that said Letters Patent is hereby corrected as shown below:

Column 8,
Line 50, please replace "surface." with -- surface, --;

Column 9,
Line 47, please replace "alone" with -- along --;

Column 10,
Lines 12 and 36, please replace "surface." with -- surface, --.

Signed and Sealed this

Seventeenth Day of May, 2005

JON W. DUDAS
*Director of the United States Patent and Trademark Office*